(12) United States Patent
Marin et al.

(10) Patent No.: US 8,602,560 B2
(45) Date of Patent: Dec. 10, 2013

(54) METHOD FOR PROVIDING A SPECTACLE OPTHALMIC LENS BY CALCULATING FOR SELECTING A DESIGN

(75) Inventors: Gildas Marin, Charenton le Pont (FR); Martha Hernandez, Charenton le Pont (FR); Pablo De Gracia Pacheco, Mostoles (ES); Susana Marcos Celestino, Madrid (ES); Carlos Diaz Dorronsoro, Madrid (ES)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 349 days.

(21) Appl. No.: 13/138,037

(22) PCT Filed: Dec. 23, 2009

(86) PCT No.: PCT/EP2009/067876
§ 371 (c)(1),
(2), (4) Date: Jun. 24, 2011

(87) PCT Pub. No.: WO2010/072820
PCT Pub. Date: Jul. 1, 2010

(65) Prior Publication Data
US 2012/0147324 A1    Jun. 14, 2012

(30) Foreign Application Priority Data

Dec. 23, 2008  (EP) .................................... 08306010

(51) Int. Cl.
*A61B 3/00*         (2006.01)

(52) U.S. Cl.
USPC ......................................................... 351/246

(58) Field of Classification Search
USPC ..................... 351/246, 247, 159.76
See application file for complete search history.

(56) References Cited

U.S. PATENT DOCUMENTS

| | | | | |
|---|---|---|---|---|
| 7,954,950 B2 * | 6/2011 | Dreher et al. | ................. | 351/246 |
| 2006/0244916 A1 * | 11/2006 | Guillon | ......................... | 351/246 |

* cited by examiner

*Primary Examiner* — Hung Dang
(74) *Attorney, Agent, or Firm* — Cozen O'Connor (57) ABSTRACT

A method implemented by computer means for optimizing the design of a spectacle ophthalmic lens comprising: a) providing the residual astigmatism value and orientation data of a spectacle ophthalmic lens design for at least one gaze direction; b) providing the astigmatism and coma values and orientations data of an eye of a wearer; c) providing an optimized spectacle ophthalmic lens comprising adapting the management of astigmatism and coma of an lens-eye system based on a combination of the astigmatism and coma of the lens-eye system so as to improve the acuity versus distortion for the wearer's eye and where the lens-eye system consists of the spectacle ophthalmic lens design and the wearer's eye, with the proviso that the RMS value of the astigmatism of the lens-eye system is equal or greater to 0.025 μm and that the RMS value of the coma of the lens-eye system is equal or greater to 0.025 μm. A computer program product carrying out at least one of the steps.

28 Claims, 5 Drawing Sheets

METHOD FOR PROVIDING A SPECTACLE OPTHALMIC LENS BY CALCULATING FOR SELECTING A DESIGN

RELATED APPLICATIONS

This is a U.S. National Phase Application under 35 USC 371 of International Application PCT/EP2009/067876 filed on Dec. 23, 2009.

This Application Claims the Priority of European Application No. 08306010.3 filed Dec. 23, 2008, the entire content of which is hereby incorporated by reference.

FIELD OF THE INVENTION

The invention relates generally to the field of vision improvement and more specifically concerns a method for providing an spectacle ophthalmic lens by calculating or selecting a design. The spectacle ophthalmic lens can be, e.g., a progressive lens, a unifocal lens. The invention also concerns a method for making a spectacle ophthalmic lens. Furthermore, the invention concerns a piece of software set up for implementing the calculation method for the design of a spectacle ophthalmic lens of the invention.

BACKGROUND OF THE INVENTION

Spectacle ophthalmic lenses are worn and widely used for correcting many different types of vision deficiencies. These include defects such as near-sightedness (myopia) and far-sightedness (hypermetropia), astigmatism, and defects in near-range vision usually associated with aging (presbyopia).

Ophthalmologists or optometrists routinely improve the visual acuity by correcting refractive errors in terms of sphere, cylinder and axis.

Astigmatism in an eye occurs when the refractive error is meridian-dependent. This is usually due to one or more refractive surfaces, most commonly the anterior cornea, having a toroidal shape.

SUMMARY OF THE INVENTION

One object of the invention is to provide a better way to meet the visual needs of lens users and improve the comfort of lens users, particularly users of progressive lens, and facilitate their adapting to the lenses.

In order to attain this and other objects, one aspect of the invention is directed to a method for optimizing the design of a spectacle ophthalmic lens comprising the following steps:

a) providing the residual astigmatism value and orientation data of a spectacle ophthalmic lens design for at least one gaze direction;

b) providing the astigmatism and coma values data and orientations of an eye of a wearer;

c) providing an optimized spectacle ophthalmic lens design by optimization of the design of the spectacle ophthalmic lens wherein the optimization comprises adapting the management of astigmatism and coma of an lens-eye system based on a combination of the astigmatism and coma of the lens-eye system so as to improve the acuity versus distortion for the wearer's eye and where the lens-eye system consists of the spectacle ophthalmic lens design and the wearer's eye.

Another aspect of the invention is directed to a method implemented by computer means for optimizing the design of a spectacle ophthalmic lens comprising the following steps:

a) providing the residual astigmatism value and orientation data of a spectacle ophthalmic lens design for at least one gaze direction;

b) providing the astigmatism and coma values data and orientations of an eye of a wearer;

c) providing an optimized spectacle ophthalmic lens design by optimization of the design of the spectacle ophthalmic lens wherein the optimization comprises adapting the management of astigmatism and coma of an lens-eye system based on a combination of the astigmatism and coma of the lens-eye system so as to improve the acuity versus distortion for the wearer's eye and where the lens-eye system consists of the spectacle ophthalmic lens design and the wearer's eye, with the proviso that the RMS value of the astigmatism of the lens-eye system is equal or greater to 0.025 µm and that the RMS value of the coma of the lens-eye system is equal or greater to 0.025 µm.

Another aspect of the invention is directed to a method for selecting a design of a spectacle ophthalmic lens comprising:

a) providing the residual astigmatism value and orientation data of a spectacle ophthalmic lens design for at least one gaze direction;

b) providing the astigmatism and coma values and orientations data of an eye of a wearer;

c) providing a plurality of spectacle ophthalmic lens designs;

d) providing a selected spectacle ophthalmic lens design by the selection of a design within the plurality of designs wherein the selection comprises adapting the management of astigmatism and coma of an lens-eye system based on a combination of the astigmatism and coma of the lens-eye system so as to improve the acuity versus distortion for the wearer's eye and where the lens-eye system consists of the spectacle ophthalmic lens design and the wearer's eye.

Another aspect of the invention is directed to a method implemented by computer means for selecting a design of a spectacle ophthalmic lens comprising:

a) providing the residual astigmatism value and orientation data of a spectacle ophthalmic lens design for at least one gaze direction;

b) providing the astigmatism and coma values and orientations data of an eye of a wearer;

c) providing a plurality of spectacle ophthalmic lens designs;

d) providing a selected spectacle ophthalmic lens design by the selection of a design within the plurality of designs wherein the selection comprises adapting the management of astigmatism and coma of an lens-eye system based on a combination of the astigmatism and coma of the lens-eye system so as to improve the acuity versus distortion for the wearer's eye and where the lens-eye system consists of the spectacle ophthalmic lens design and the wearer's eye, with the proviso that the RMS value of the astigmatism of the lens-eye system is equal or greater to 0.025 µm and that the RMS value of the coma of the lens-eye system is equal or greater to 0.025 µm.

In the frame of the present invention a "design" of a spectacle ophthalmic lens has to be understood as the part of the optical system of said lens which is not determined by the wearer standard prescription parameters consisting of sphere, cylinder, axis and power addition values determined for said wearer.

In an embodiment of the invention, the RMS value of the astigmatism of the lens-eye system is equal or greater to a threshold value and that the RMS value of the coma of the lens-eye system is equal or greater to a threshold value. According to an embodiment said threshold value is chosen as 0.025 μm.

According to an embodiment, the threshold value is 0.05 μm. According to another embodiment, the threshold value is 0.1 μm.

RMS is defined as the root mean square value of the parameter, also known as the quadratic means.

According to an example the pupil size of the eye is 6 mm.

One can easily determine corresponding values for a different pupil size. According to an embodiment this transformation is made according to the teaching of L. Lundstrom and P. Unsbo (Biomedical and X-ray Physics, Royal Institute of Technology, Sweden)—"*Transformation of Zernike coefficients: scaled, translated, and rotated wavefronts with circular and elliptical pupils*"—Vol. 24, n° 3/March 2007/J. Optical Society of America.

According to an embodiment, the combination of the astigmatism and the coma of the lens-eye system consists in a functional combination or linkage of said astigmatism and coma.

According to embodiments of the present invention, the optimization or selection of the design of the optimized or selected spectacle ophthalmic lens relates to one eye or both eyes of the wearer.

Spectacle ophthalmic lenses, and particularly progressive lens, are fraught with residual aberrations, mostly astigmatism. Thus, the invention provides improvement and management of residual astigmatism of a spectacle lens based on the astigmatism and coma and orientation data of the wearer's eyes and thus optimizing the acuity/distortion compromise. In fact, the inventors were able to verify that the impact of residual astigmatism on vision depends on the coma direction of the wearer. Astigmatism and coma orientation and value data may be combined to improve or reduce visual performance based on their respective orientations.

According to an embodiment of the present invention, the wearer is a virtual wearer and the wearer's eye is a model eye. Examples of a "models eye" are disclosed in the publication "*Finite schematic eye models and their accuracy to in-vivo data*"—Ravi C. Bakaraju; Klaus Ehrmann; Eric Papas; Arthur Ho—Vision Research 48 (2008) 1681-1694.

According to an embodiment of the present invention, the chosen "model eye" is a "Navarro et al." model eye as disclosed in "*Accommodation-dependent model of the human eye with aspherics*"—Navarro R.; Santamaria J. & Bescos J. (1985)—*Journal of the Optical Society of America A*, 2(8) 1273-1281.

According to another embodiment of the present invention, the wearer's eye is the actual eye of a wearer and the improved spectacle ophthalmic lens is customized for said wearer. According to this embodiment the astigmatism and coma values and directions data of the eye of the wearer are measured. Said measured data may be obtained when using an aberrometer.

Both astigmatism and coma features related data comprise a "value" and a "direction" data. The "value" data relates to the maximum amplitude of the feature and the direction relates to the angle of said feature.

In the frame of the present invention, the values signs and variations are expressed according to OSA recommendations, as described in the following standard: "*American National Standard for Ophthalmics—Methods for reporting optical aberrations of the eye*"; 2004: *ANSI Z*80.28-2004.

FIGS. 1*a*, 1*b*, 2*a* and 2*b* illustrate wave front surfaces in the pupil of a lens-eye system, where the size of the pupil is 6 mm (−3 to +3 mm). Said wave front surfaces are represented as Z-iso-curves according to the surface of the pupil. According to an example, the abscissa axis (X axis) is the horizontal line of the pupil, the ordinate axis (Y axis) is the vertical line of the pupil when the person is standing and the (0, 0) point is the center of the pupil. Z-iso-curves are expressed in μm and represent the difference of a wave front surface and a reference surface of an aberration free lens-eye system.

Figure 1A:
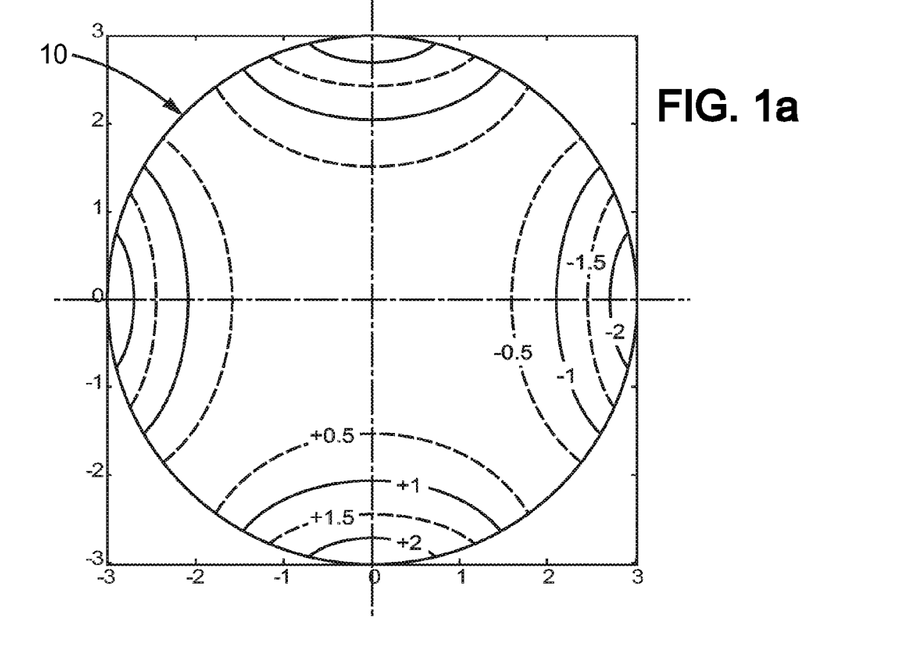
FIGS. 1a and b, 2a and b show wavefront surfaces in a pupil.
Figure 1B:
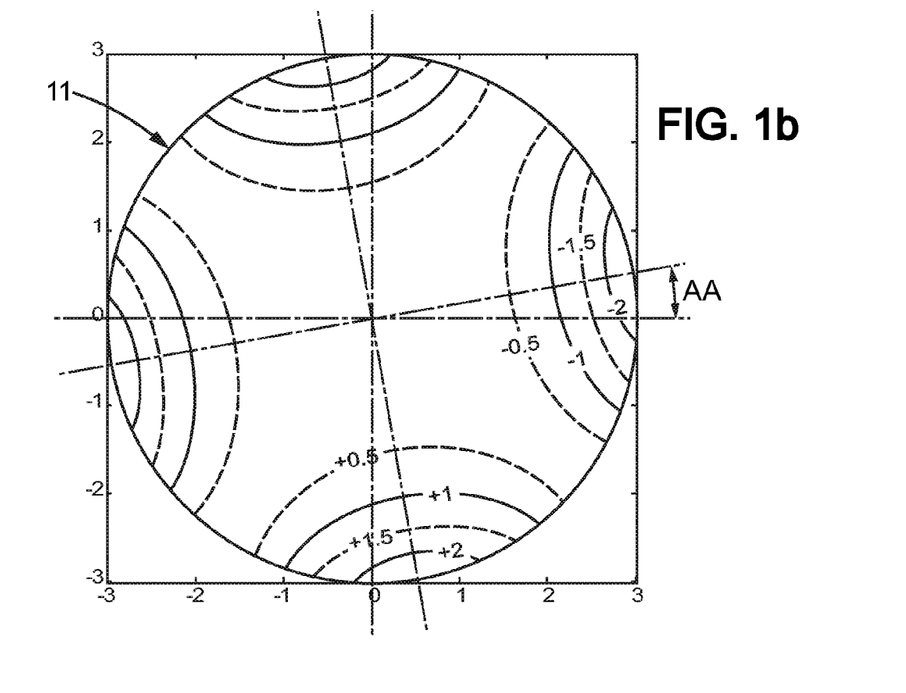

FIGS. 1*a* and 1*b* show a wavefront surface corresponding to astigmatism of 1 Diopter. According to FIG. 1*a*, the astigmatism orientation is nil and the Z-iso-curves are symmetric according to both abscissa axis and ordinate axis.

The Z maxima and minima are placed on the abscissa and ordinate axes.

According to FIG. 1*b*, the astigmatism is tilted from angle AA when comparing to FIG. 1*a*. The Z maxima and minima are tilted from the AA angle from the abscissa and ordinate axes. Said angle AA is called the angle of the astigmatism direction in the frame of the present invention.

Figure 2A:
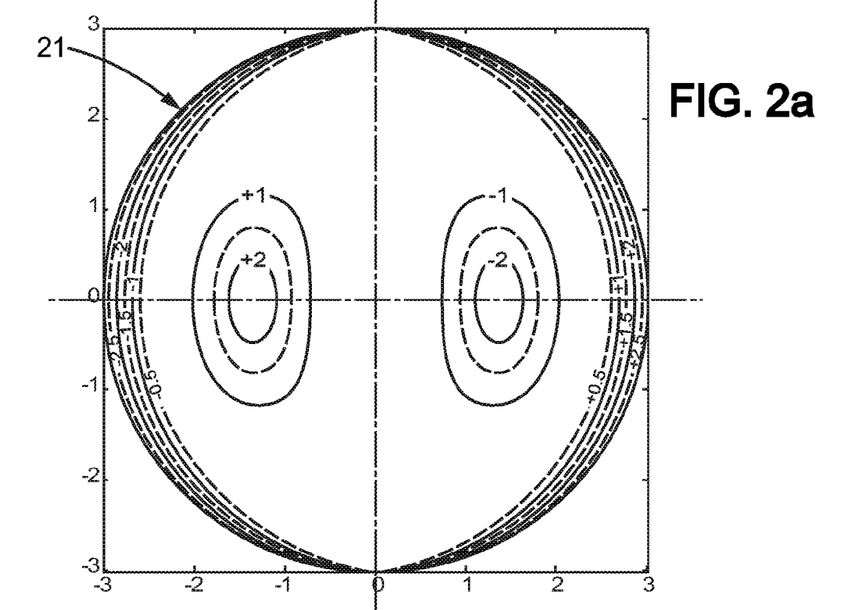
Figure 2B:
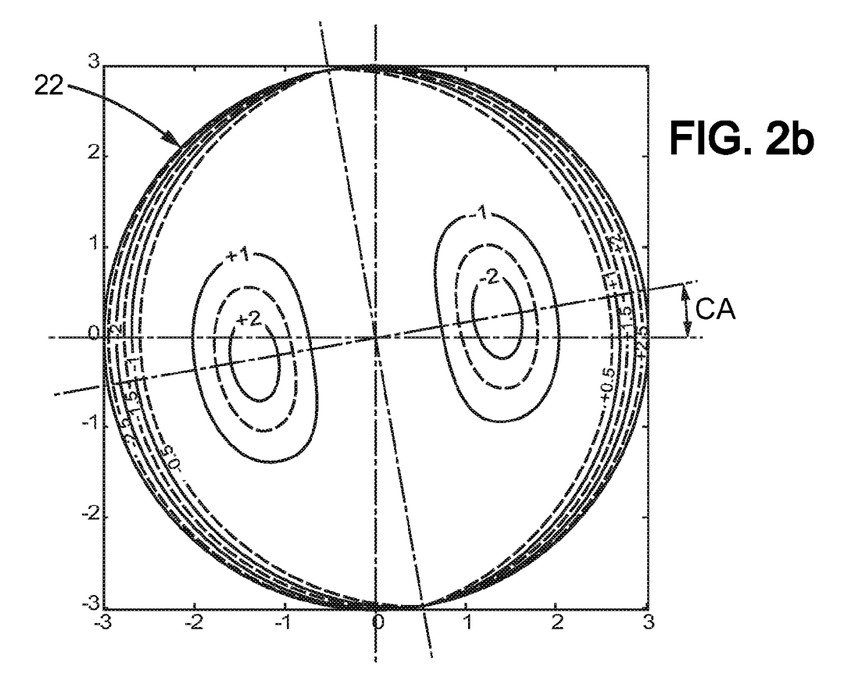

FIGS. 2*a* and 2*b* show a wavefront surface corresponding to a coma aberration where the coma root mean square (RMS) value is 1 μm.

According to FIG. 2*a*, the coma orientation is nil and the Z-iso-curves are symmetric according to the ordinate axis, but the sign of said Z-iso-curve is opposite.

The maxima and minima Z values can be found for Y=0 and X=−3 μm; X=+3 μm; X=−1.4 μm; X=+1.4 μm.

According to FIG. 2*b*, the coma is tilted from an angle CA when comparing to FIG. 2*a*. Said angle CA is called the angle of the coma direction in the frame of the present invention.

According to different embodiments of the present invention, that may be combined:

the management of the astigmatism and coma of the lens-eye system (LES) is implemented by using an angular parameter $\phi$, where $\phi$ is the difference between the angle (AA) of the residual astigmatism direction and the angle (CA) of the coma direction of the lens-eye system; thus, according to the here above mentioned definitions:

$$\phi = AA(\text{RA\_LES}) - CA(\text{RC\_LES}),$$

wherein,

RA_LES is the residual astigmatism of the lens-eye system, and

RC_LES is the residual coma of the lens-eye system;

the management of the astigmatism and coma of the lens-eye system consists in choosing a desired angle $\phi d$ for the lens-eye system, the angle $\phi d$ being determined as a function of the parameter SPH/RMS_CA, where:

SPH is the sphere value of the lens-eye system; according to an embodiment of the present invention, SPH corresponds to the $Z\_4$ term of a Zernike polynomial expansion;

RMS_CA is the root mean square value of the coma and astigmatism of the lens-eye system;

the angle $\phi d$ continuously decreases from about 90° to about 0° when the parameter SPH/RMS_CA increases from about −1 to about 1 and wherein the SPH parameter, the astigmatism value and the coma value of the lens-eye system are expressed in length unit, such as μm unit;

the $\phi$ value is about 45° when SPH/RMS_CA is about 0. According to an embodiment, $\phi d$ is equal to about ar cos (SPH/RMS_CA)/2;

the management of the astigmatism and coma of the lens-eye system consists in choosing a desired ratio RAC for the lens-eye system, where the ratio RAC is defined as the ratio between astigmatism value and the coma value of the lens-eye system and the desired ratio RAC is chosen so as: $1 \leq RAC \leq 3$;

the initial and improved spectacle ophthalmic lenses are spectacle progressive addition lenses comprising a far vision zone, an intermediate vision zone and a near vision zone;

the coma value and orientation data are determined in a plurality of gaze direction of the intermediate vision zone.

According to an embodiment, the wavefront can be analysed using Zernike polynomials. Such an analysis is for example recommended by the Optical Society of America (OSA) for describing ocular wavefront aberrations, but other polynomials, such as for example Taylor series or splines can also be used to mathematically describe a wavefront.

The Zernike expansion presents the aberrations in an orthogonal set of polynomials. It can be displayed in the form of a pyramid. Vertically each row represents a typical form of aberration; these are called (radial) orders. The top is called the zero order, which actually is no aberration but a constant that can be added for e.g. scaling. The second row (the first order) represents prismatic effects. Each presentation of an aberration is called a term. The prismatic effects are based vertical ($Z\_2$ term, up or down) and horizontal ($Z\_3$ term, in or out). Since the zero and first orders ($Z\_1$-$3$ terms) are linked to specific visual defects, or to specific measurement conditions, these are usually not pictured. It starts to become interesting as of the second order. In the middle of the pyramid, defocus ($Z\_4$ term) can be found. It is placed at the axis line of the pyramid. This is because defocus (spherical part of a refraction) is rotational symmetric (zero angular frequency). On both sides of defocus, the astigmatic (cylinder in the refraction) terms $Z\_3$ and $Z\_5$ can be found. These are special conditions of defocus because they work in one meridian only. Consequently these must be indicated with a direction (axis of the cylinder), $Z\_3$ for oblique astigmatism and $Z\_5$ for horizontal astigmatism. The third order aberrations include coma and trefoil, each has a direction, so no Z term in this row at the middle. Coma values and orientation data relate to $Z\_7$ and $Z\_8$ terms. $Z\_7$ is the horizontal component of the coma and $Z\_8$ is the vertical component of the coma; thus the coma value is $(Z\_7^2+Z\_8^2)^{1/2}$ and the angle of the coma direction, CA, is artan $(Z\_8/Z\_7)$. Next are 5 terms of the $4^{th}$ order. Spherical aberrations ($Z\_12$) is rotational symmetric, the other terms (with a direction) are secondary astigmatism and tetra foil. For describing aberrations in optics the pyramid continues with many more orders and terms. Usually these are in the eye not present or very low. Even within the 14 Z terms as discussed not all terms are of equal importance to the eye. For the eye the second order aberrations are called "low order aberrations" and include the sphere and cylinder value of the refraction. Third orders and above are called "higher order aberrations".

Based on the Zernike polynomial expansion, the root mean square value of the coma and astigmatism, RMS_CA, is:

$$RMS\_CA=(Z\_3^2+Z\_5^2+Z\_7^2+Z\_8^2)^{1/2}$$

Aberrometers, that are wavefront sensors for the specific measurement of the eye, are instruments designed to measure the wavefront of the eye, including sphere, cylinder and the higher-order aberrations.

Using such instrument makes possible to measure and/or calculate the aberrations level of an eye and separate the contribution of low and higher order aberrations, namely the coma data. An aberrometer is designed to measure the wavefront of the eyes including sphere, cylinder, and the higher-order aberrations. Shack-Hartmann aberrometry is known as the most popular way to measure aberrations of the human eye in use today. Commercial ophthalmic Shack-Hartmann aberrometers are for example sold by Wave Front Sciences Inc, VISX, ALCON, Imagine Eyes (see for example irx3 aberrometer).

Said aberrometers measure the wavefront shape by measuring the distance between the wavefront surface refracted by an eye's optic and a reference plane located in the eye's entrance pupil. This distance is known as the wavefront error. A Shack-Hartmann data set consists of a large array of numbers (wavefront errors) for different position on the pupil plane. As a whole, the entire data set is called the wavefront.

Root Mean Square values can be expressed in length unit, as for example in micrometer (μm).

In absence of aberrations, the intensity is a maximum at a Gaussian image point.

"Strehl Ratio", hereafter "SR", is used to characterize aberrations: it is the ratio of the intensity at the Gaussian image point (the origin of the reference sphere is the point of maximum intensity in the observation plane) in the presence of higher order aberrations, divided by the intensity that would be obtained if no aberration were present. Thus, the higher the SR value is, the higher is the acuity.

Aberrations RMS value may be measured using wavefront analysis.

The invention also relates to a method for manufacturing an improved spectacle ophthalmic lens for a wearer, the method comprising the following steps:

aa) optimizing or selecting a design of a spectacle ophthalmic lens according to respectively previous design optimizing method or design selection method, and determining an optical system (OS) according to said design and to the wearer's prescription;

bb) providing a lens substrate;

cc) manufacturing the spectacle ophthalmic lens according to the optical system (OS) corresponding to the calculated or selected design in step aa).

According to different embodiments, said method for manufacturing incorporates the previously described features and the different embodiments of the preceding method for providing an improved spectacle ophthalmic lens to a wearer.

Another aspect of the invention relates to a computer program product comprising one or more stored sequence of instruction that is accessible to a processor and which, when executed by the processor, causes the processor to carry out at least one of the steps of the different embodiments of the preceding methods.

Another aspect of the invention relates to a computer-readable medium carrying one or more sequences of instructions of the preceding computer program product.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

The features of the present invention, as well as the invention itself, both as to its structure and its operation, will be best understood from the accompanying non limiting drawings and examples, taken in conjunction with the accompanying description, in which.

DESCRIPTION OF PREFERRED EMBODIMENTS

Figure 3:
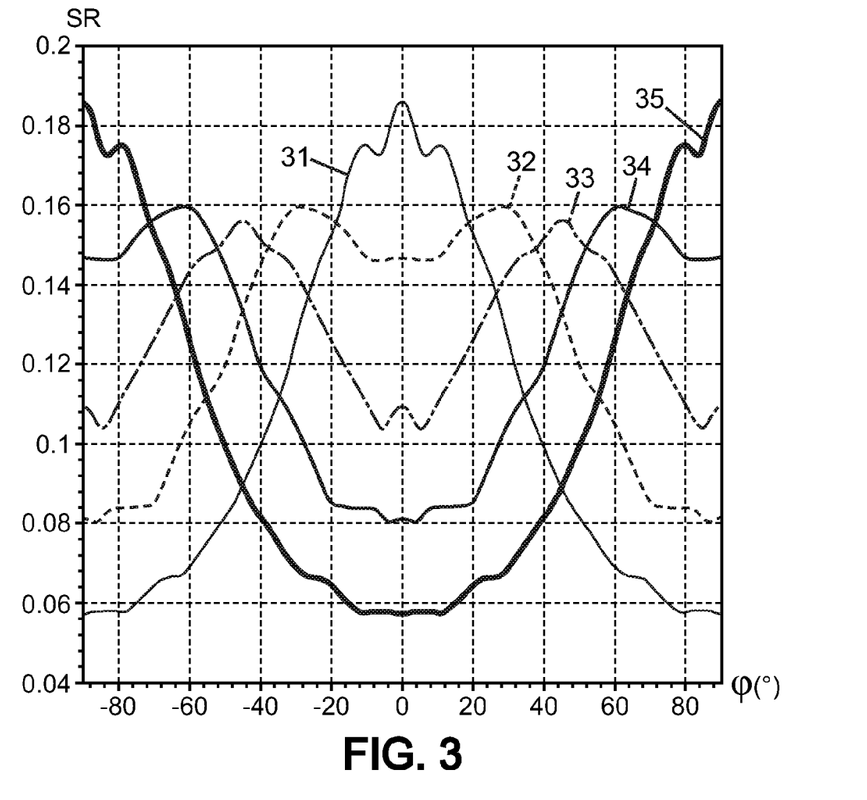
FIG. 3 illustrates the variation of the Strehl ratio as a function of $\phi$ for different SPH values.

FIG. 3 illustrates the variation of the Strehl ratio, SR, as a function of the angular parameter $\phi$ (varying from −90° to 90°). According to following examples, the Strehl ratio, SR, is calculated as the ratio of the MTF volume with the aberrations of the system to be considered and of the MTF volume calculated without aberrations.

MTF is the function that represents the amplitude of the modulation (or the contrast of a sinusoidal periodic structure) in the image obtained from the object by the optical system for each spatial frequency (see for example: Handbook of lens design, Malacara D. & Malacara Z. pages 295 to 303, 1994 Marcel Dekker Inc.). It is possible to calculate the volume of the MTF by integrating this function over a spatial frequency range that is typically between 0 and infinity. Many other typical parameters are describe in "Accuracy and precision of objective refraction from wavefront aberrations", Larry N. Thibos, Xin Hong, Arthur Bradley, Raymond A. Applegate, Journal of Vision (2004) 4, see pages 329 to 351.

Five SR($\phi$) curves are shown on FIG. 3 where the astigmatism value of the lens-eye system is equal to 0.25 μm, and the coma value of the lens-eye system is equal to 0.14 μm; thus the RMS_CA is equal to 0.287 μm; the sphere value, SPH, of the lens-eye system varies from a value equal to plus RMS_CA to a value equal to minus RMS_CA according to following table:

| Curve number | SPH (μm) | SPH/RMS | $\phi$(SRmax) |
|---|---|---|---|
| 31 | 0.287 | 1 | 0° |
| 32 | 0.144 | 0.5 | +/−30° |
| 33 | 0 | 0 | +/−45° |
| 34 | −0.144 | −0.5 | +/−60° |
| 35 | −0.287 | −1 | +/−90° |

Each curve 31 to 35 presents at least a Strehl ratio maximum, SRmax, for a given $\phi$ angle. Said angle is reported in preceding table as $\phi$(SRmax). There is thus a clear relationship between the management of astigmatism and coma of the lens-eye system based on a combination of the lens-eye system which offers possibilities to improve the acuity versus distortion for a wearer.

Figure 4:
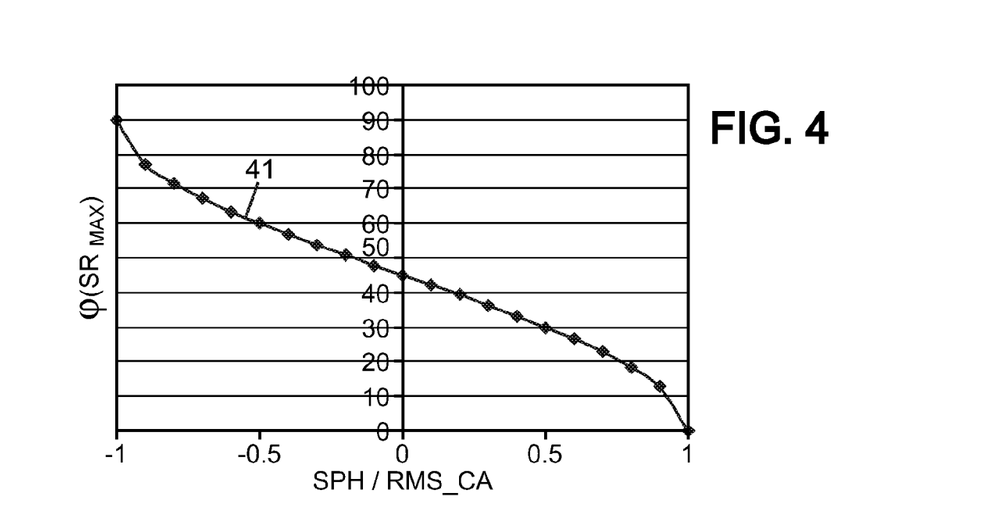
FIG. 4 illustrates the variation of $\phi$ according to SPH/RMS_CA.

FIG. 4 gives further indications to improve the acuity versus distortion. FIG. 4 represents the variation of $\phi$(SRmax) according to SPH/RMS_CA. According to the present embodiment, the values of the SPH parameter, the astigmatism value and the coma value are expressed in μm. One can see that $\phi$(SRmax) continuously decreases from 90° to 0° when the parameter SPH/RMS_CA increases from −1 to 1.

Thanks to the data of FIG. 4, it appears that one can suggest to choose a desired $\phi$ value, $\phi$d, for the lens of lens-eye system to be optimized or selected so as $\phi$d approaches the values of $\phi$(SRmax) in order to improve the acuity versus distortion of the wearer. Thus, according to a non limiting embodiment the desired $\phi$d angle continuously decrease from about 90° to about 0° when the parameter SPH/RMS_CA increases from about −1 to about 1.

As $\phi$(SRmax)=45° for SPH/RMS_CA=0, according to an embodiment of the present invention $\phi$d is about 45° for SPH/RMS_CA is about 0.

One can fit the $\phi$(SRmax) function versus SPH/RMS_CA with following equation: $\phi$(SRmax)=ar cos(SPH/RMS_CA)/2.

According to an embodiment of the present invention $\phi$d is thus equal to about ar cos(SPH/RMS_CA)/2.

According to an embodiment, the wording "about" used for $\phi$d means plus/minus 20°, as for an example plus/minus 10°, from the mentioned value.

According to an embodiment, the wording "about" used for the SPH/RMS_CA parameter means plus/minus 0.2, as for an example plus/minus 0.1, from the mentioned value.

Figure 5:
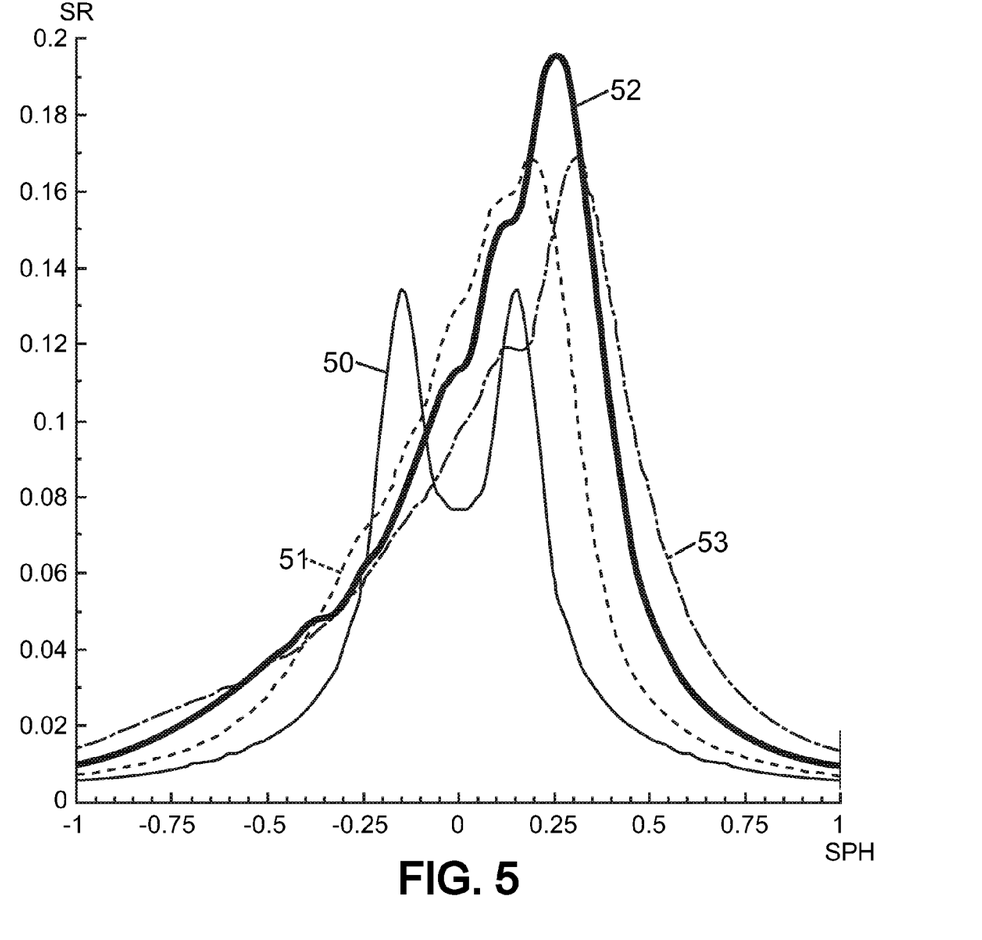
FIG. 5 illustrates the variation of the Strehl ratio for different coma values when $\phi=0$.

FIG. 5 shows the variation of the Strehl ratio, SR, according to the SPH (in μm) parameter for a given $\phi$d value equal to nil ($\phi$d=0°, thus where AA=AC) and a given astigmatism value of 0.25 Diopter. Four curves 50 to 53 are represented for different coma values according to following table:

| Curve number | Coma value (μm) |
|---|---|
| 50 | 0 |
| 51 | 0.08 |
| 52 | 0.14 |
| 53 | 0.2 |

It clearly appears that, for a given astigmatism value and a given SPH parameter value, one can enhance the Strehl ratio when choosing a coma value.

Figure 6:
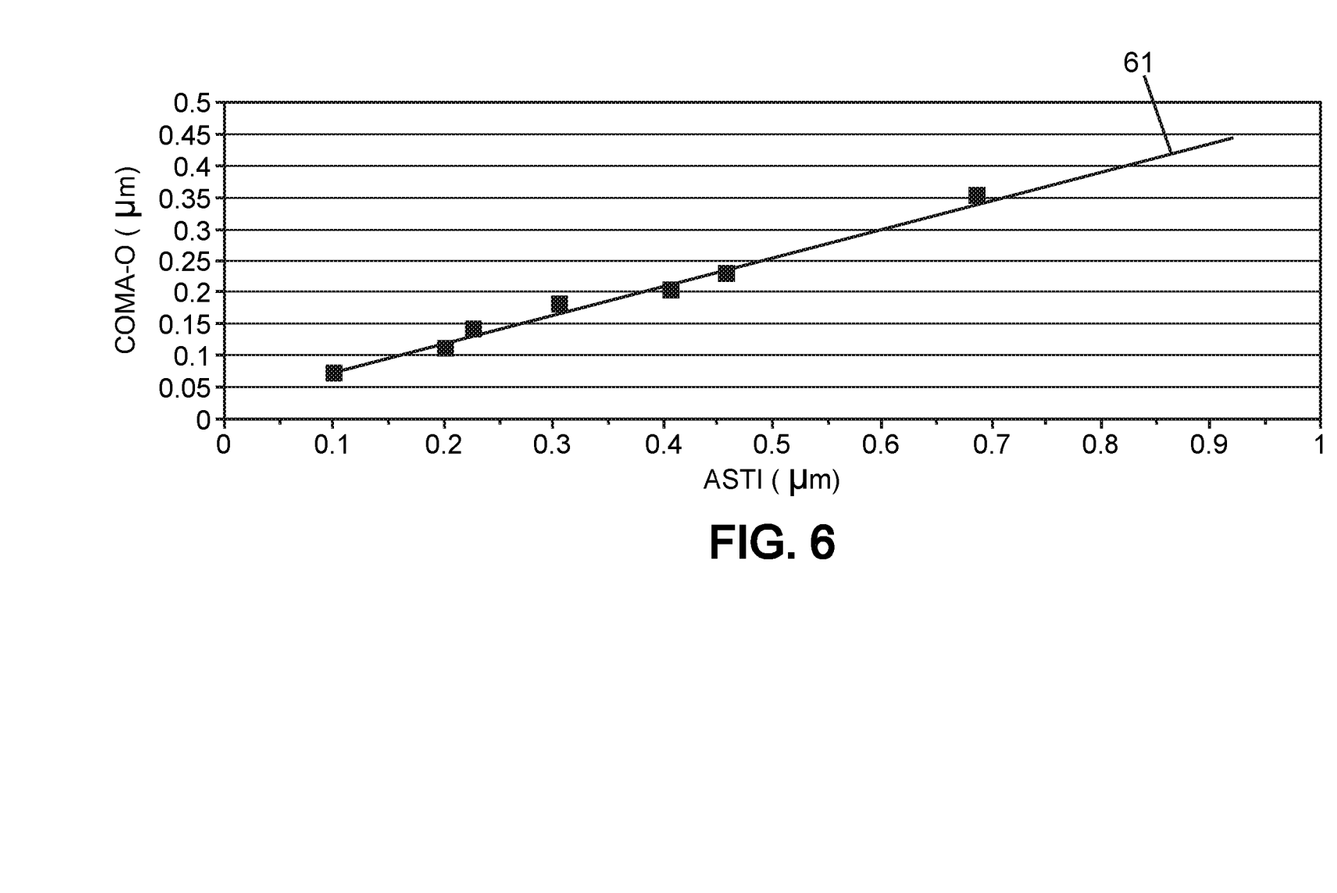
FIG. 6 illustrates the variation of the optimal coma value as a function of the astigmatism value.

On this basis curve 61 of FIG. 6 has been drawn, where for a given astigmatism one can determine an optimum coma value, COMA-O, that offers an optimum Strehl ratio for the lens-eye system. On the other hand, it is also possible to determine an optimum astigmatism for a given coma value that offers an optimum Strehl ratio for the lens-eye system.

According to an embodiment of the present invention, the desired ratio RAC of the lens-eye system is chosen between 1 and 3.

Thus, thanks to the teaching of the present invention one can optimize a design of a spectacle lens or select a design of a spectacle lens for an eye in order to enhance the Strehl ratio, thus the acuity, of the lens-eye system.

The method according to the invention can be used to optimize the selection of an already existing lens design for a wearer. In particular, it is possible to either use or not use a function allowing for a better fit with a prescribed correction in the whole of the visual field, or a function taking into account assembly parameters and mode of wear, depending on astigmatism and coma values and orientations data.

According to an embodiment of the present invention, the design of the spectacle ophthalmic lens for a wearer is selected among a plurality of spectacle ophthalmic lens designs according to the present invention and the optical system of the lens for the wearer is obtained by combining the chosen design and the prescription data for the wearer.

According to another embodiment of the present invention, a design is calculated for a wearer by adapting the management of astigmatism and coma of the lens-eye system based on the measure of astigmatism and coma orientations and/or values of the spectacle ophthalmic lens and the wearer's eye.

Said design calculation may be implemented according to design calculation methods known from a man skilled in the art where at least an optimization parameter is related to the desired $\phi$ angle and/or the desired RAC ratio defined in at least a gaze direction of the lens-eye system.

The invention has been described above with the aid of embodiments without limitation of the general inventive concept, in particular numerous calculation and/or manufacturing methods known from the man skilled in the art could be used in order to adapt the management of residual astigmatism according to the present invention.

The invention claimed is:

1. A method implemented by computer means for optimizing the design of a spectacle ophthalmic lens comprising:
   a) providing the residual astigmatism value and orientation data of a spectacle ophthalmic lens design for at least one gaze direction;
   b) providing the astigmatism and coma values and orientations data of an eye of a wearer; and
   c) providing an optimized spectacle ophthalmic lens design by optimization of the design of the spectacle ophthalmic lens wherein the optimization comprises adapting the management of astigmatism and coma of an lens-eye system based on a combination of the astigmatism and coma of the lens-eye system so as to improve the acuity versus distortion for the wearer's eye and where the lens-eye system consists of the spectacle ophthalmic lens design and the wearer's eye, with the proviso that the RMS value of the astigmatism of the lens-eye system is equal or greater to 0.025 μm and that the RMS value of the coma of the lens-eye system is equal or greater to 0.025 μm.

2. The method according to claim 1, wherein the wearer is a virtual wearer and the wearer's eye is a model eye.

3. The method according to claim 1, wherein the wearer's eye is the actual eye of a wearer and wherein the improved spectacle ophthalmic lens is customized for said wearer.

4. The method according to claim 1, wherein the management of the astigmatism and coma of the lens-eye system is implemented by using an angular parameter $\phi$, where $\phi$ is the difference between the angle (AA) of the residual astigmatism direction and the angle (CA) of the coma direction of the lens-eye system.

5. The method according to claim 4, wherein the management of the astigmatism and coma of the lens-eye system consists in choosing a desired angle $\phi d$ for the lens-eye system, the angle $\phi d$ being determined as a function of the parameter SPH/RMS_CA, where:
   SPH is the sphere value of the lens-eye system;
   RMS_CA is the root mean square value of the coma and astigmatism of the lens-eye system.

6. The method according to claim 5, wherein the desired angle $\phi d$ continuously decreases from about 90° to about 0° when the parameter SPH/RMS_CA increases from about −1 to about 1 and wherein the SPH parameter, the astigmatism value and the coma value of the lens-eye system are expressed in length unit, such as μm unit.

7. The method according to claim 6, wherein the $\phi d$ value is about 45° when SPH/RMS_CA is about 0.

8. The method according to claim 6, wherein $\phi d$ is equal to about arcos (SPH/RMS_CA)/2.

9. The method according to claim 1, wherein the management of the astigmatism and coma of the lens-eye system consists in choosing a desired ratio RAC for the lens-eye system where the ratio RAC is defined as the ratio between astigmatism value and the coma value of the lens-eye system and the desired ratio RAC is chosen so as:

$$1 \leq RAC \leq 3.$$

10. The method according to claim 1 wherein the initial and improved spectacle ophthalmic lenses are spectacle progressive addition lenses comprising a far vision zone, an intermediate vision zone and a near vision zone.

11. The method according to claim 10, wherein the coma value and orientation data are determined in a plurality of gaze direction of the intermediate vision zone.

12. A method for manufacturing an improved spectacle ophthalmic lens for a wearer, the method comprising the following steps:
   aa) optimizing or selecting a design of a spectacle ophthalmic lens according to claim 1 and determining an optical system according to said design and to the wearer's prescription;
   bb) providing a lens substrate;
   cc) manufacturing the spectacle ophthalmic lens according to the optical system (OS) corresponding to the calculated or selected design in step aa).

13. A computer program product comprising one or more stored sequence of instruction that is accessible to a processor and which, when executed by the processor, causes the processor to carry out the steps of claim 1.

14. A computer-readable medium carrying one or more sequences of instructions of the computer program product of claim 13.

15. A method implemented by computer means for selecting a design of a spectacle ophthalmic lens comprising:
   a) providing the residual astigmatism value and orientation data of a spectacle ophthalmic lens design for at least one gaze direction;
   b) providing the astigmatism and coma values and orientations data of an eye of a wearer;

c) providing a plurality of spectacle ophthalmic lens designs;

d) providing a selected spectacle ophthalmic lens design by the selection of a design within the plurality of designs wherein the selection comprises adapting the management of astigmatism and coma of an lens-eye system based on a combination of the astigmatism and coma of the lens-eye system so as to improve the acuity versus distortion for the wearer's eye and where the lens-eye system consists of the spectacle ophthalmic lens design and the wearer's eye, with the proviso that the RMS value of the astigmatism of the lens-eye system is equal or greater to 0.025 μm and that the RMS value of the coma of the lens-eye system is equal or greater to 0.025 μm.

16. The method according to claim 15, wherein the wearer is a virtual wearer and the wearer's eye is a model eye.

17. The method according to claim 15, wherein the wearer's eye is the actual eye of a wearer and wherein the improved spectacle ophthalmic lens is customized for said wearer.

18. The method according to claim 15, wherein the management of the astigmatism and coma of the lens-eye system is implemented by using an angular parameter $\phi$, where $\phi$ is the difference between the angle (AA) of the residual astigmatism direction and the angle (CA) of the coma direction of the lens-eye system.

19. The method according to claim 18, wherein the management of the astigmatism and coma of the lens-eye system consists in choosing a desired angle $\phi d$ for the lens-eye system, the angle $\phi d$ being determined as a function of the parameter SPH/RMS_CA, where:

SPH is the sphere value of the lens-eye system;

RMS_CA is the root mean square value of the coma and astigmatism of the lens-eye system.

20. The method according to claim 19, wherein the desired angle $\phi d$ continuously decreases from about 90° to about 0° when the parameter SPH/RMS_CA increases from about −1 to about 1 and wherein the SPH parameter, the astigmatism value and the coma value of the lens-eye system are expressed in length unit, such as μm unit.

21. The method according to claim 20, wherein the $\phi d$ value is about 45° when SPH/RMS_CA is about 0.

22. The method according to claim 20, wherein $\phi d$ is equal to about arcos (SPH/RMS_CA)/2.

23. The method according to claim 15, wherein the management of the astigmatism and coma of the lens-eye system consists in choosing a desired ratio RAC for the lens-eye system where the ratio RAC is defined as the ratio between astigmatism value and the coma value of the lens-eye system and the desired ratio RAC is chosen so as:

$1 \leq RAC \leq 3$.

24. The method according to claim 15, wherein the initial and improved spectacle ophthalmic lenses are spectacle progressive addition lenses comprising a far vision zone, an intermediate vision zone and a near vision zone.

25. The method according to claim 24, wherein the coma value and orientation data are determined in a plurality of gaze direction of the intermediate vision zone.

26. A method for manufacturing an improved spectacle ophthalmic lens for a wearer, the method comprising the following steps:

aa) optimizing or selecting a design of a spectacle ophthalmic lens according to claim 15 and determining an optical system (OS) according to said design and to the wearer's prescription;

bb) providing a lens substrate;

cc) manufacturing the spectacle ophthalmic lens according to the optical system (OS) corresponding to the calculated or selected design in step aa).

27. A computer program product comprising one or more stored sequence of instruction that is accessible to a processor and which, when executed by the processor, causes the processor to carry out the steps of claim 15.

28. A computer-readable medium carrying one or more sequences of instructions of the computer program product of claim 27.

* * * * *